United States Patent
Drago et al.

(10) Patent No.: US 6,471,215 B1
(45) Date of Patent: Oct. 29, 2002

(54) LABYRINTH SEALING DEVICE HAVING A GREASE PURGEABLE SYSTEM

(75) Inventors: James Drago; Joel R. Shaw; Jeffrey M. Grudzien, all of Fairport, NY (US)

(73) Assignee: Garlock Sealing Technologies LLC, Palmyra, NY (US)

( * ) Notice: Subject to any disclaimer, the term of this patent is extended or adjusted under 35 U.S.C. 154(b) by 0 days.

(21) Appl. No.: 09/514,099

(22) Filed: Feb. 28, 2000

(51) Int. Cl.[7] .............................................. F16J 15/447
(52) U.S. Cl. ...................... 277/412; 277/418; 277/419; 277/420; 277/421
(58) Field of Search .................................. 277/418, 419, 277/420, 421, 358, 361, 371, 374, 411, 412, 928

(56) References Cited

U.S. PATENT DOCUMENTS

| | | | |
|---|---|---|---|
| 2,188,784 A | 1/1940 | Grothouse | 286/11 |
| 2,386,496 A | 10/1945 | Northup | 288/3 |
| 2,822,197 A | 2/1958 | Champ | 286/8 |
| 2,979,350 A | 4/1961 | Lansky | |
| 3,021,182 A | 2/1962 | Schnacke | 308/187 |
| 3,480,284 A | 11/1969 | Voitik | 277/26 |
| 3,536,334 A | 10/1970 | Kendall | 277/103 |
| 4,344,631 A | 8/1982 | Winn | 277/29 |
| 4,494,760 A | 1/1985 | Spargo | 277/30 |
| 5,009,435 A | 4/1991 | Villanyi et al. | 277/23 |
| 5,028,205 A | 7/1991 | Kapadia et al. | 415/112 |
| 5,074,567 A | 12/1991 | Orlowski | |
| 5,100,157 A | 3/1992 | Chabala | 277/27 |
| 5,316,317 A | 5/1994 | Fedorovich et al. | 277/1 |
| 5,480,161 A * | 1/1996 | Borowski | 277/53 |
| 5,522,601 A | 6/1996 | Murphy | 277/53 |
| 5,951,020 A * | 9/1999 | Orlowski | 277/419 |
| 6,015,153 A | 1/2000 | Sharrer | |
| 6,182,972 B1 * | 2/2001 | Orlowski | 277/350 |

FOREIGN PATENT DOCUMENTS

| | | |
|---|---|---|
| EP | 0027539 | 9/1980 |
| GB | 2219475 A | 12/1989 |

* cited by examiner

*Primary Examiner*—Anthony Knight
*Assistant Examiner*—Matthew E. Rodgers
(74) *Attorney, Agent, or Firm*—John M. Harrington; Kilpatrick Stockton LLP

(57) ABSTRACT

A grease purgeable dynamic labyrinth sealing device is disclosed which includes a stator having an annular engagement flange on a radially inner portion thereof and a rotor having an annular engagement flange on a radially outer portion thereof. The stator annular engagement flange and the rotor annular engagement flange have coacting means for mechanically interlocking the stator and the rotor. In one embodiment, means, such as, for example, a plurality of apertures, are operatively formed in the stator for allowing excess grease applied to the bearing housing to move through the stator and out of the stator such that the grease purgeable dynamic labyrinth sealing device maintains proper position relative to the bearing housing and is rotatable with the shaft. In another embodiment, means, operatively formed on the rotor, are provided for reducing the size of the contacting surface area between the stator and the rotor such as, for example, an annular ring or protrusion formed on the surface of the rotor which contacts the stator or vice versa. In yet another embodiment, means are operatively formed on the stator, for increasing the resistance of the stator to move away from the bearing housing when excess grease exits the bearing housing between the bearing housing and the stator, such as, for example, relatively more shallow portions of the O-ring grooves formed in the stator that allow the O-rings to compress when the stator is moved away from the bearing housing.

43 Claims, 2 Drawing Sheets

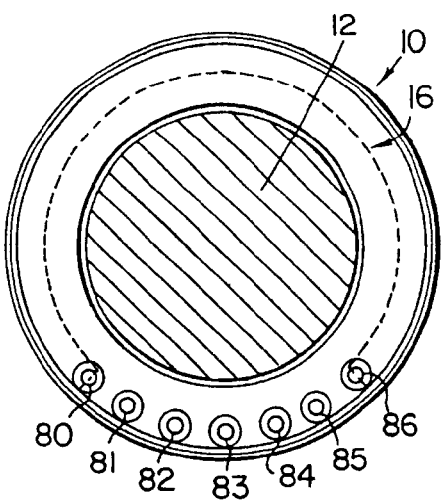
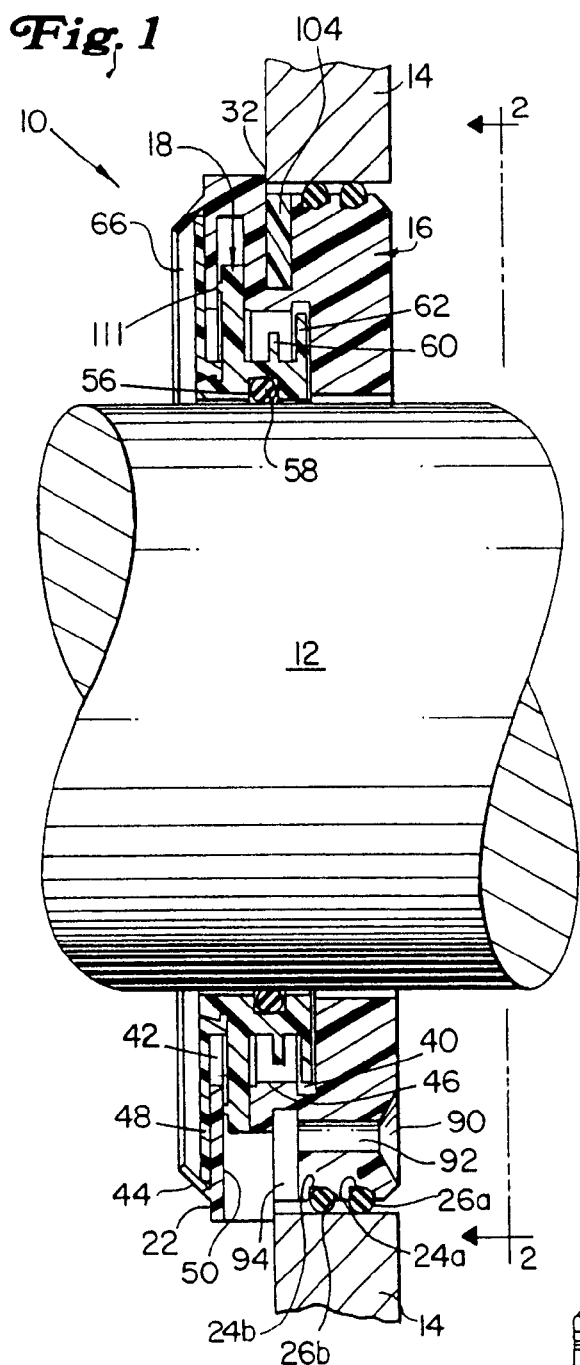
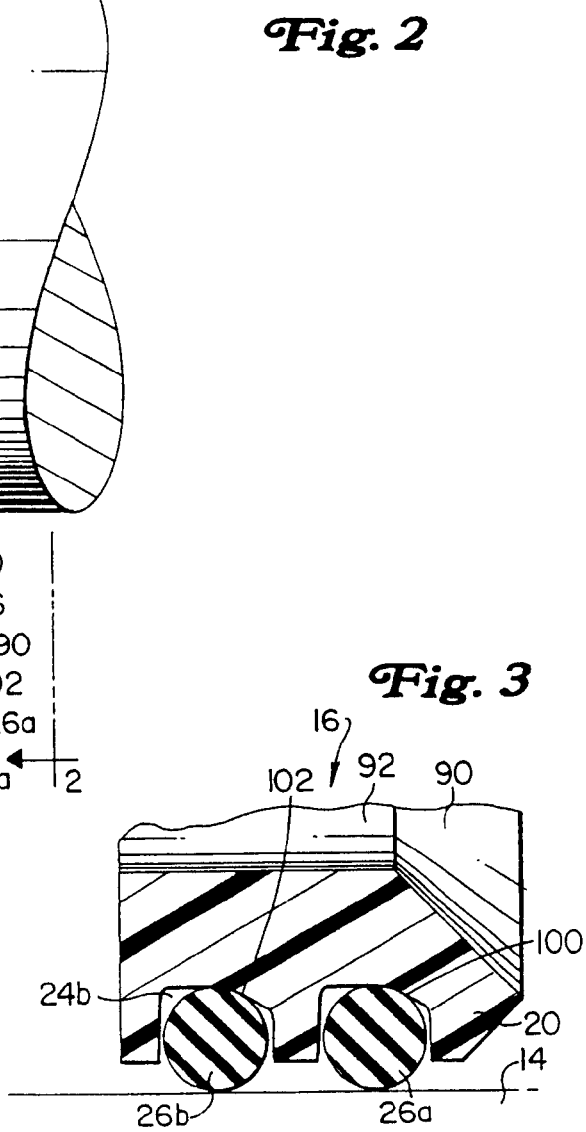

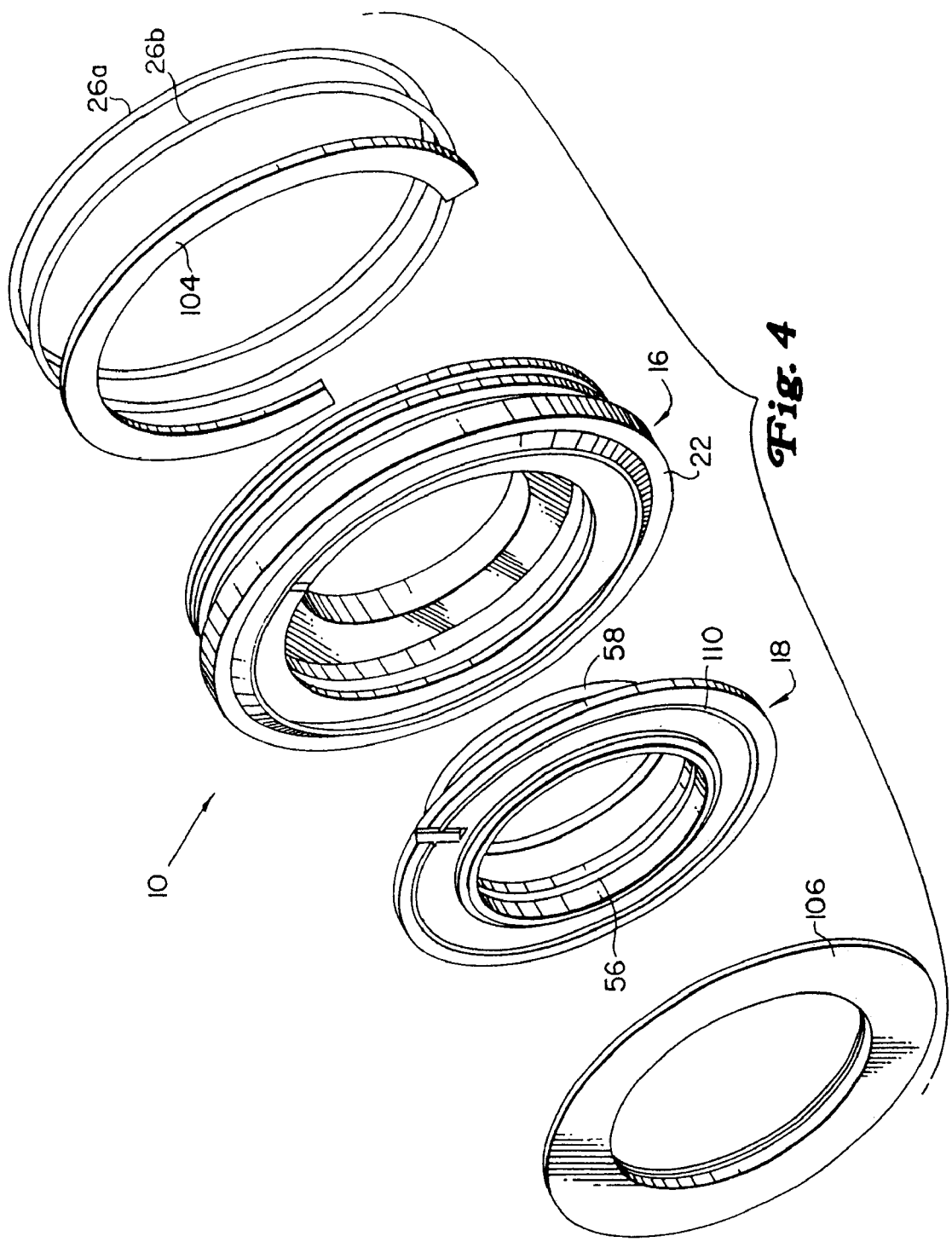

LABYRINTH SEALING DEVICE HAVING A GREASE PURGEABLE SYSTEM

RELATED APPLICATION

This application is related to commonly owned U.S. Pat. Nos. 6,015,153 and 5,908,195 issued Jan. 18, 2000 and Jun. 1, 1999, respectively, of Sharrer, the disclosure of each is herein incorporated by reference.

BACKGROUND OF THE INVENTION

The present application, as presently envisioned, relates to mechanical joint packing devices, and more particularly, to a labyrinth sealing device for providing a dynamic seal between a rotating shaft and a bearing housing and, most particularly, to a grease purgeable labyrinth sealing device that is designed to eliminate the failure problems caused by applying excessive grease to the bearings being protected by the labyrinth sealing device.

Before May 1977, rubber lip seals protected the bearings in most industrial process pumps. Only those pumps that were designed for API service—petroleum refinery duty specifications—were fitted with labyrinth seals. Those labyrinth seals were designed primarily to keep the lubricant inside the bearing frame. They were ineffective in preventing contaminants from entering the bearing.

A failed lip seal in an HVAC pump prevented occupancy of the Sears Tower in Chicago shortly after it was built. Chilled water was needed to temper the sun load on the south side of the building. Water spray from a leaking mechanical seal entered the bearing housing and the pump shut down. Consequently, the southern windows on the top floors were popping out, making the building uninhabitable. Special labyrinth seals were installed to replace the lip seals and the pump was again in operation.

Because of the lack of reliable bearing protection, pump bearings were short-lived and considered expendable. Contamination by moisture, dust, dirt and the liquid being pumped, even loss of lubricant through the lip seals, was commonplace. Lip seals either grooved the shaft or "carbonized" at the contact point, allowing free movement of contaminant and lubricant in or out of the bearing housing.

Clearly, a better method of protecting pump bearings were sorely needed, one that would be permanent and effective, and, in effect, "isolate" the bearing environment. In 1977, no such device existed in the world. An all-out effort to solve the problem and satisfy the performance gap resulted in the first "bearing isolators." These isolators were compound labyrinth seals, non-contacting, non-wearing and absolute in nature. Field trials proved the effectiveness of the new device, where all other methods of bearing protection had failed.

After quick rejections by nearly every major pump manufacturer in the U.S., the manufacturer of the isolator contacted the pump users in the process industries. After field installation of the new device, it was almost immediately apparent to the users that the enhanced reliability of the pumping equipment would prove to be an economical investment. Pump manufacturers rapidly responded to the customers and installed bearing isolators on new equipment whenever they were specified by users, but only then.

Today, almost every process pump produced in the U.S. is fitted with some sort of labyrinth sealing device. Enlightened pump users are retrofitting most of their repaired pumps and motors. Long-term cost savings and productivity improvements in the process industries are the results.

Shortly after the introduction of the bearing isolator, many competitors entered the niche market. Most offered similar products, but others were made of lightweight PTFE derivatives. Even magnetic face seals were successfully applied as bearing isolators in pumps and gears.

The most common form of rotating equipment in use in the process industries is the three-phase AC electric motor, varying in size for one through 500 horsepower. It is believed that more than 40 million motors are installed in the U.S. alone. Combined, they consume approximately 70 percent of the electrical power generated for industrial use. Motors have been manufactured in essentially their present form for nearly 100 years, without regard to effective bearing protection.

Since the days of Edison and Steinmetz, only rubber flingers or slingers inhibited direct ingress of contamination into the exposed bearing compartment. Therefore, mechanical—not electrical—failure is the overwhelming cause of motor outage. Users in the process industries recognized the obvious faults in motor design and rated bearing failure as the No. 1 cause of failures in NEMA frame drivers.

The reliability of pumps and motors has vastly improved over the past 20 plus years, due primarily to enhancement of bearing integrity. If a rolling element bearing is kept clean and well lubricated, it will conceivably perform for 150,000 hours (17 years) or more. ANSI pump manufacturers are warranting their pump bearing frames for three years. Motor manufacturers are typically warranting their bearing-protected motors for five years.

Typically, a bearing isolator is a mechanical device that permanently isolates a bearing from its environment. It should be non-contacting and non-wearing and must prevent humidity and moisture from entering the bearing enclosure during start and stop cycles.

Bearing isolators are easy to install, most have an interference fit with the bearing cap or end-bell, so they should be pressed into place with an arbor press, although the user sometimes prefers to tap them with a soft hammer.

Ideally, "maintenance" is the act of keeping equipment in running order. Maintenance is not a "fix it when it breaks down" function, as it may have been considered in the past. Reactive maintenance is disruptive of the manufacturing process and therefore an expensive luxury for the manufacturer. Pumps and motors are the most common forms of rotating equipment and require the most attention by the maintenance activity.

Preventive maintenance is also expensive and usually excessive for the job at, hand. Preventive maintenance is usually performed based on elapsed time, whether or not the equipment needs attention. The theory was to prevent catastrophic failures of process equipment by anticipating the weak links in the equipment design and replacing the weak link equipment before the failure thereof.

Predictive maintenance is now the methodology of choice for a majority of process industry professionals. Vibration analysis, thermography usually infrared technology and lubricant condition inspection are commonly used tools that predict a breakdown before it actually occurs.

If a rotating equipment maintenance cycle is less than the ideal design life of the component parts (bearing, mechanical seals or, in the case of electric motors, the electrical insulation), an effort should be made to design maintenance out of the equipment. Instead of spending the entire maintenance effort on condition-based, fixed time, or reactionary maintenance, a good maintenance organization should invest a significant portion of the budget toward cost-avoidance and equipment design enhancements.

Replacing the lip seals in pumps and the flingers and slingers on motor shafts has been proven to increase the mean time between planned maintenance by a factor of two. If the maintenance activity directed to pumps and motors is cut in half each year for three years, such activity will be reduced to 12.5 percent of the current benchmark. A return on investment as high as 400 percent is commonly attainable.

Historically, process pumps have had a useful service life of 2.8 years before being repaired in some way or another. Industrial motors fare much better, averaging 5.7 years until their first repair or replacement. Company personnel usually repair pumps on-site, while motors typically are sent off-site to a repair facility.

To minimize disruption to the maintenance department, pump repairs and bearing isolator upgrades are done in chronological order, according to specific instructional assistance provided by the isolator manufacturer's field personnel. Motors are sent to the repair facility along with specific instructions and specifications to install bearing isolators on the shaft and fan ends. Manufacturer's personnel will be on hand, as required, to assist and educate the repair facility employees as to the application and installation of bearing isolators.

Recent reliability enhancements to pumps and motors have had a significant impact on the productivity of maintaining rotating equipment in the process industries. Over their useful lives, pumps and motors consume much more maintenance and power costs than their original price tags. Users now analyze and value total life cycle costs when evaluating manufacturer's offerings. An initial modest investment in superior bearing protection in pumps and motors will pay dividends for years to come.

The bearing isolator is a design of compound labyrinth seal specially adapted to protect bearings in rotating equipment. It has only two major parts—a rotor and a stator—but is assembled as a single unit, locked together by an internal vapor-blocking O-ring. The unit is press fitted into the bearing housing, using the same cavity that would be used for a lip seal or flinger. In addition to the mechanical lock-up on O-rings gasket seals the stator to the housing.

The rotor fits over the shaft and is driven by one or more O-rings. The drive ring(s) act as a seal against the shaft. The rotor and stator do not touch, so they do not wear out. Before contaminants, such as dirt or water, can get into the bearing housing, they must pass through a complex labyrinth pattern involving grooves, expansion chambers and direction changes. Contaminants are collected and expelled back into the environment through an expulsion port in the stator. Similarly, lubricant is drained back into the bearing housing by means of collection grooves and gravity drain.

When the equipment is at rest, the internal O-ring engages both the rotor and stator and thus hermetically seals the bearing housing from humidity. Upon start-up, the O-ring turns with the rotor and centrifugal force circumferentially stretches and expands it so it no longer touches the stator and hence, does not wear.

Labyrinth type rotary shaft seals are well known in the art. Typically, these devices include two concentric ring structures, which define a rotor and a stator. The rotor is sealing engaged with a rotating shaft, and the stator is sealingly engaged with a bearing housing. Specifically contoured pathways or grooves are formed in the interior surfaces of the seal rings to create a maze or labyrinth extending between the exterior of the bearing housing to the interior of the bearing housing. The labyrinth pathway serves as a hydrodynamic barrier to maintain fluid lubricants within the bearing housing and prevent contaminants from entering the bearing housing. The more elaborate the pathway, the less chance there is that contaminating materials will pass through the structure and into the bearing housing. One way of making a more elaborate pathway is to increase the amount of surface area that must be traversed by contaminating materials, i.e., increase the length of the pathway.

In general, the extent of the surface area of the labyrinth pathway will be limited by the degree of mechanical interlock between the two components of the device upon assembly. If the interlocking contact area between the components is relatively small, there will be less surface area to form a labyrinth pathway therebetween. Conversely, if the interlocking contact area between the two components is relatively large, there will be a greater surface area to form a more elaborate labyrinth pathway between the two components.

An example of a prior art labyrinth sealing device in which there is a low degree of mechanical interlock between the rotor and the stator is disclosed in U.S. Pat. No. 4,466,620 to Orlowski. In the Orlowski device, the rotor is provided with an axially extending annular flange for engaging a complementary axially extending annular recess formed in the stator. An example of a prior art labyrinth sealing device in which there is a high degree of mechanical interlock between the rotor and the stator is disclosed in U.S. Pat. Nos. 5,316,317 and 5,431,414 to Fedorovich et al. This is mechanical interlock is achieved during assembly by initially heating the connective portion of the stator to expand the diameter thereof. The connective portion of the rotor is then positioned radially inside of the connective portion of the stator. The stator is then permitted to cool to effect the interlock between the two components.

Although the Fedorovich et al. device provides an elaborate labyrinth pathway to prevent contaminants from passing through the structure, its method of assembly is both time consuming and inefficient. Accordingly, until recently a need existed in the art to provide a labyrinth type rotary shaft seal in which there is a high degree of mechanical interlock between the component parts thereof that can be assembled quickly and efficiently.

U.S. Pat. Nos. 6,015,193 and 5,908,195 solved a considerable number of the mechanical interlock and assembly issues. However, no solution has been proposed to eliminate the problem caused by the application of excessive grease to bearings in the bearing housing and the resultant dislodgment of the labyrinth sealing devices protecting the bearings in the bearing housing. Thus, there is a need in the art to provide a labyrinth type shaft seal that significantly reduces, if not totally eliminates, that dislodgment of the labyrinth sealing devices when excess grease has been applied to the bearing housing.

Such labyrinth type rotary shaft seals should provide a means for allowing the excess grease to flow through the stator of the labyrinth type rotary seals and be directed away from the labyrinth type seals without the labyrinth type rotary seals being dislodged from their protective position relative to the bearing housing or the labyrinth becoming clogged with any of the excess grease. Such labyrinth type rotary shaft seals should provide for increased resistance to dislodgment from the protective position relative to the bearing housing when pressure, such as excess grease, from the bearing housing side of the seal, which would tend to move the seal away from the bearing housing, is increased. Such labyrinth type rotary shaft seals should provide means for grease to be routed from the bearing housing, through the stator of the labyrinth type rotary seals while the labyrinth type rotary seal remains in the proper position relative to the bearing housing in order to protect the bearings from contamination. Such labyrinth type rotary shaft seals should provide means for reducing the contact area between the stator and the rotor should the stator and the rotor be forced together in order to extent the useful life of labyrinth type rotary seals.

SUMMARY OF THE INVENTION

The subject invention is directed to grease purgeable dynamic labyrinth sealing devices for placement between a rotating shaft and a bearing housing. The device includes a stator for sealingly engaging the bearing housing and a rotor for sealing engaging the rotating shaft. An elaborate labyrinth pathway is defined between the stator and rotor for preventing contaminants from passing through the device. The stator has an annular engagement flange on a radially inner portion thereof and the rotor has an annular engagement flange on a radially outer portion thereof. The stator annular engagement flange and the rotor annular engagement flange have coacting means for mechanically interlocking the stator and the rotor. Once interlocked, the annular engagement flanges form part of the labyrinth pathway.

Preferably, the coacting means includes an outer radial engagement notch formed in the stator engagement flange and an inner radial engagement notch formed in the rotor engagement flange. The outer radial engagement notch and the inner radial engagement notch include complementary angled engagement surfaces. The stator engagement flange and the rotor engagement flange each have opposed leading and trailing axial surfaces, and the complementary angled surfaces of the radial engagement notches are dimensioned and configured to facilitate progressive opposed lateral deflection of the engagement flanges and effectuate juxtaposition of the leading axial surface of the rotor engagement flange and the trailing axial surface of the stator engagement flange.

In accordance with the subject application, at least one annular recess is formed in a radially outer portion of the stator for supporting an elastomeric O-ring between the stator and the bearing housing. Similarly, at least one annular recess is formed in a radially inner portion of the rotor for supporting an elastomeric O-ring between the rotor and the rotating shaft. In addition, at least one aperture having a counter sink, presently preferred, about a forty-five degree (45°) counter sink, is formed in the portion of the stator that is most proximate to the bearing housing in a location such that any material that enters the aperture is directed down from the stator via a drainage or expulsion port. In its presently preferred embodiment, at least one aperture and presently preferably, seven (7) apertures are formed in the stator such that each aperture is operatively connected to the expulsion port.

At least one annular groove is formed in the radially outer portion of the rotor, in a location spaced from the engagement flange thereof, for capturing contaminants drawn into the grease purgeable dynamic labyrinth sealing device from outside the bearing housing. A radial exhaust slot or expulsion port is preferably formed in the stator to facilitate the expulsion of captured contaminants from the sealing device.

An annular sealing lip projects from a leading edge of the radially outer portion of the stator for sealingly engaging a leading edge of the radially outer portion of the rotor, providing an additional barrier to contaminants.

In accordance with a preferred embodiment of the subject application, means, such as, for example, a plurality of apertures are operatively formed in the stator for allowing excess grease applied to the bearing housing to move through the stator and out of the stator such that the grease purgeable dynamic labyrinth sealing device maintains proper position relative to the bearing housing and is rotatable with the'shaft.

In accordance with another preferred embodiment of the subject application, means, operatively formed on the rotor for reducing the size of the contacting surface area between the stator and the rotor such as, for example, an annular ring or protrusion formed on the surface of the rotor which contacts the stator or vice versa.

In accordance with yet another preferred embodiment of the subject application, means, operatively formed on the stator, are provided for increasing the resistance of the stator to move away from the bearing housing when excess grease exits the bearing housing between the bearing housing and the stator, such as, for example, more shallow portions of the O-ring grooves that allow the O-rings to compress when the stator is moved away from the bearing housing.

An object of the present application is to provide a grease purgeable dynamic labyrinth sealing device for preventing the application of excess grease to the bearing housing from dislodging a grease purgeable dynamic labyrinth sealing device.

Another object of the present application is to provide s a grease purgeable dynamic labyrinth sealing device for routing excess grease from the bearing housing thorough the stator and outside a grease purgeable dynamic labyrinth sealing device.

A further object of the present application is to provide a grease purgeable dynamic labyrinth sealing device for resisting axial displacement away from the bearing housing when excess grease applies pressure to the bearing housing and the grease moves past the bearing housing toward the stator of the grease purgeable dynamic labyrinth sealing device.

Yet a further object of the present application is to provide a grease purgeable dynamic labyrinth sealing device for increasing the contact pressure between the stator O-rings and the bearing housing when pressure is applied to a grease purgeable dynamic labyrinth sealing device from the direction of the bearing housing.

Yet another object of the present application is to provide a grease purgeable dynamic labyrinth sealing device for maintaining the position of a labyrinth seal relative to a bearing housing when excess grease is applied to the bearings in the bearing housing.

In accordance with these and further objects, one aspect of the present application includes a dynamic sealing device for placement between a rotating shaft and a bearing housing comprising: a stator having an annular engagement flange on a radially inner portion thereof and fluid passage means, operatively formed in the portion of the stator most proximate to the bearing housing, for allowing fluid to move from the bearing housing through the stator and out of the stator; and a rotor having an annular engagement flange on a radially outer portion thereof, the stator and the rotor being operatively connected.

Another aspect of the present application includes a dynamic sealing device for placement between a rotating shaft and a bearing housing comprising: a stator having an annular engagement flange on a radially inner portion thereof and fluid passage means, operatively formed in the portion of the stator most proximate to the bearing housing, for allowing fluid to move from the bearing housing through the stator and out of the stator; a rotor having an annular engagement flange on a radially outer portion thereof, the stator and the rotor being operatively connected; and grooves, operatively positioned on the stator, the grooves including means for increasing the contact pressure between O-rings operatively positioned in the grooves for interacting with the bearing housing when pressure is applied to the dynamic labyrinth sealing device from the direction of the bearing housing.

Still another aspect of the present application includes a dynamic sealing device for placement between a rotating shaft and a bearing housing comprising: a stator having an annular engagement flange on a radially inner portion thereof and fluid passage means operatively formed in the portion of the stator most proximate to the bearing housing, for allowing fluid to move from the bearing housing through the stator and out of the stator; and a rotor having an annular engagement flange on a radially outer portion thereof and an annular ring operatively formed on the portion thereof that contacts the stator when the rotor and the stator are forced into contact when the rotor rotates, the stator and the rotor being operatively connected.

Other objects and advantages of the invention will be apparent from the following description, the accompanying drawings and the appended claims.

DETAILED DESCRIPTION OF THE PREFERRED EMBODIMENTS

Figure 1:
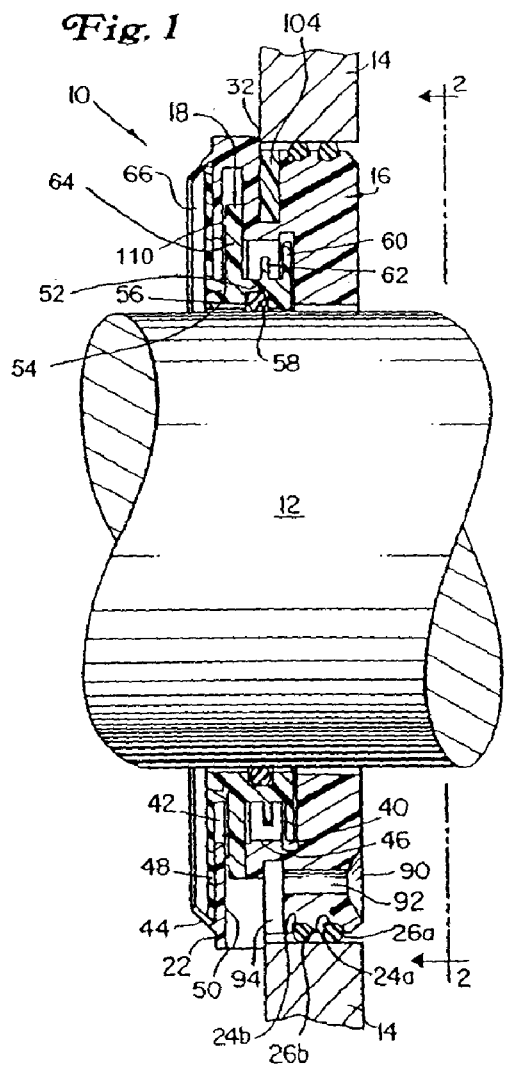
FIG. 1 is a cross-sectional view of a labyrinth sealing device constructed in accordance with a preferred embodiment of the subject application and installed between a rotating shaft and a bearing housing.

Referring now in detail to the drawings wherein like reference numerals identify similar structural elements of the subject invention, there is illustrated in FIG. 1 a dynamic sealing device constructed in accordance with a preferred embodiment of the subject application and designated generally by reference numeral 10. Referring to FIG. 1, sealing device 10 is employed between a rotating axial shaft 12 and a bearing housing 14 containing a fluid lubricant to prevent leakage of lubricants from the housing and entry of contaminants into the housing. More particularly, the sealing device is designed as a two-piece labyrinth seal, which operates to prevent the migration of the lubricants and/or the contaminants in either direction. The device is preferably formed from polytetrafluoroethylene (PTFE) although alternative self-lubricating materials of construction may also be employed. The selected material of construction must however, exhibit memory retention after elastic deformation.

In the detailed description which follows, the term "inboard" shall refer to the side of sealing device 10 or component part thereof that is closest to the interior of bearing housing 14, while the term "outboard" shall refer to the side of sealing device 10 or component part thereof that is closest to the exterior of bearing housing 14. Additionally, the terms "trailing" and "leading," when used to describe the relative positions of certain component parts of the sealing device 10, shall have the same or substantially the same meaning as the terms "inboard" and "outboard," respectively.

Figure 4:
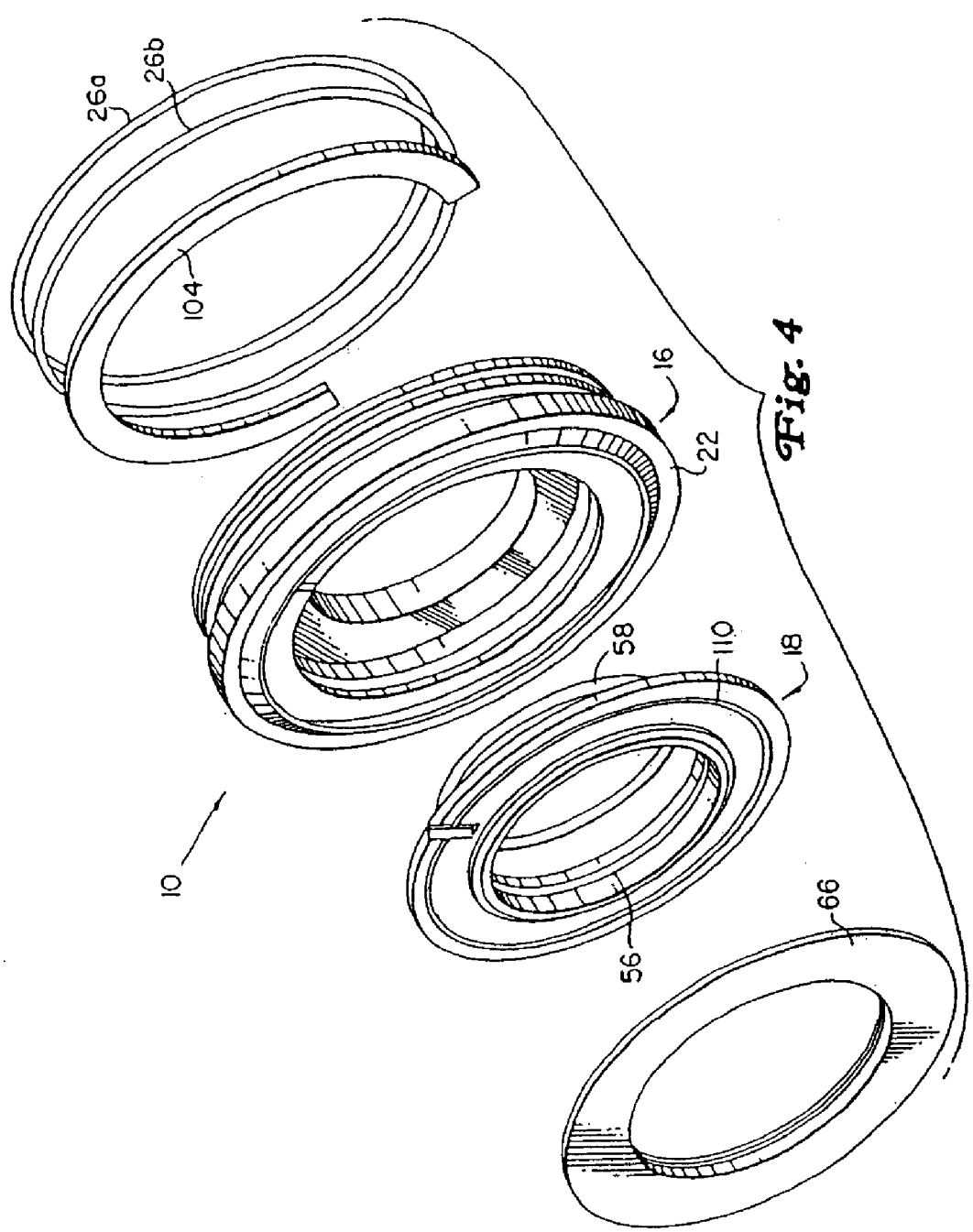
FIG. 4 is an exploded perspective view of one embodiment of the labyrinth sealing device of the subject application.

Referring to FIGS. 1 and 4, sealing device 10 includes an annular stator 16 for sealingly engaging bearing housing 14 and an annular rotor 18 for sealingly engaging the axial shaft 12. The annular stator 16 is defined by an annular main body portion 20 and a forwardly extending annular cover portion 22 which are integrally formed with one another as a monolithic unit. As shown in FIG. 1, the main body portion 20 includes a pair of annular slots 24a and 24b in a radially outer surface thereof for accommodating a pair of elastomeric sealing rings 26a and 26b designed to compressibly engage the inner periphery of the shaft bore that extends through the wall of bearing housing 14 to secure stator 16 from rotation relative to the rotor 18. The annular cover portion 22 has a larger outer diameter that the main body portion 20 and the shaft bore and resides outside of the bearing housing 14 with the shoulder surface 32 thereof abutting the exterior surface of the housing 14 when installed.

As best seen in FIG. 4, the cover portion 22 of stator 16 is dimensioned and configured to completely enclose and fully circumscribe annular rotor 18. The radially inner surface of cover portion 22 forms in one specific embodiment a stepped annular engagement area which defines an elaborate labyrinthine pathway designed to prevent the ingress of contaminants from the atmosphere into the bearing housing 14, and provides the structural interface to rotatably engage rotor 18.

Referring to FIG. 1, the stepped engagement area of stator 16 is defined by an inboard engagement channel 40, an outboard engagement channel 42 and a radial engagement lip 44. However, in one possible embodiment, this part is eliminated as is the cover. An annular land surface 46 is formed between engagement channels 40 and 42, and an annular engagement flange 48 is formed between the outboard engagement channel 42 and the radial engagement lip 44. As illustrated in FIG. 1, outboard engagement channel 42 has a lesser radial depth than inboard engagement channel 40. As will be discussed in greater detail hereinbelow, each of these structures accommodates a complementary structure formed in the radially outer surface of rotor 18.

As best seen in FIG. 1, a radially outwardly extending exhaust slot 50 extends from outboard engagement channel 42, through the annular cover portion 22 of stator 16, to the atmosphere, for discharging contaminants that may enter into the labyrinthine pathway created between the engagement surfaces of the stator and rotor. When the sealing device 10 is installed, exhaust slot 50 is preferably positioned at a dead bottom center location with respect to the longitudinal axis of rotating shaft 12.

With continuing reference to FIG. 1, rotor 18 is defined by an annular body portion 52 having an interior bore 54 dimensioned to accommodate axial shaft 12. An annular retention slot 56 is defined in the radially inner surface of body portion 52 to accommodate an elastomeric sealing ring 58 dimensioned to sealingly engage the outer periphery of axial shaft 12 and facilitate the movement of rotor 18 therewith, relative to stator 16 and bearing housing 14.

As illustrated in FIGS. 1 and 4, a series of radially outwardly projecting flanges of varying radially dimension extend from the annular body portion 52 of rotor 18 to further define the labyrinth pathway of sealing device 10. These include a first inboard engagement flange 60 dimensioned and configured to interact with inboard engagement channel 40, an intermediate barrier flange 62 positioned in opposition to annular land surface 46, an outboard engagement flange 64 dimensioned and configured to interact with outboard engagement channel 42. Inboard engagement flange 60 has a greater radial height than intermediate barrier flange 62, while outboard engagement flange 64 has a greater radial height than both the inboard and intermediate flanges 60 and 62.

Referring once again to FIG. 1, rotor 18 also includes a outboard face plate 66 which, when engaged by radial engagement lip 44, encloses the labyrinth pathway defined between stator 16 and rotor 18, and which, together with engagement lip 44, form the primary barrier to contaminates entering bearing housing 14. Engagement lip 44 is flexible with respect to outer periphery of cover portion 22, thus, during assembly, lip 44 deflects radially outwardly to receive and sealingly engage outboard face plate 66.

In order to achieve a high degree of mechanical interlock that exists between the stator 16 and rotor 18 of sealing device 10, the two components are provided with a unique engagement mechanism that incorporates a pair of coacting complementary engagement notches defined in stator engagement flange 48 and rotor engagement flange 64 that facilitate the manual assembly of sealing device 10, as described in U.S. Pat. Nos. 6,015,153 and 5,908,195.

Historically, only greaseless seals or standard oil seals have been used for applications where the potential for excess grease being applied to the bearings was likely. The grease purgeable dynamic labyrinth sealing device innovation allows the use of labyrinth seal configurations in some areas where labyrinth configurations have not previously been used.

The problem that needed to be solved involved maintenance people filling the bearing cavity housing the bearings in order to relubricate the bearings with grease from a grease gun. Excess grease from the relubricated bearings flow into the labyrinth sealing device and pressurizing the entire bearing cavity with excess grease flowing out of the cavity and into the stator of the dynamic labyrinth sealing device. The pressure pushed the labyrinth sealing device right out of its protective position relative to the bearing housing and onto the floor or it would move the stator over into the rotor preventing the rotor from rotating with the shaft and, thus, accelerating bearing failure. Usually, if enough pressure were placed on the labyrinth sealing device, the excess grease would pop the labyrinth sealing device right out of the machine and right onto the floor.

With the grease purgeable dynamic labyrinth sealing device design, a grease path is established within the stator, which leads to an expulsion port, which will relieve the pressure caused by the excess grease. With this new grease purgeable dynamic labyrinth sealing device design, the bearings can be sufficiently lubricated and any excess grease can escape without the labyrinth sealing device being dislodged form its proper position for protecting the bearings. So, with the grease purgeable dynamic labyrinth sealing device, the bearings are better protected and their useful life is significantly increased, thereby increasing the uptime of the equipment having the bearings that are protected by the grease purgeable labyrinth sealing device.

The grease expulsion path which is formed and housed strictly within the stator and, thus, keeps grease away from the rotor which houses the labyrinth. As is known, grease in the rotor tends to render the labyrinth ineffective. The grease purgeable concept keeps the excess grease away from the labyrinth path in the rotor.

Before the development of the grease purgeable labyrinth sealing device of the present application, the standard labyrinth sealing device could be and often was dislodged or popped out by over filling the bearing housing with grease. The unskilled, non-knowledgeable typical person that goes around a factory and regreases bearings often applied excessive grease in the bearing housing and, thus, created excessive pressure on the labyrinth seal, which often caused the labyrinth sealing device to become dislodged from its protective position relative to the bearing housing, to pop out of its protective position or filling the labyrinth path in the rotor with grease, resulting in the degradation of performance of the labyrinth sealing device.

Specifically, the excess grease tended to overcome the force between the O-rings and the bearing housing . If the excess grease did not dislodge the labyrinth sealing device, it would force the stator over into the rotor and the pressure between the two components will be so great that undue wear resulted between the dynamic labyrinth sealing device parts.

In today's factories, it is not uncommon for a maintenance man with a grease gun to wait until he hears the pop and the crackle so he knows that the grease is coming out of the part being lubricated and by that time he hears the sounds, he has destroyed the integrity of the dynamic labyrinth sealing device.

The unique feature of the present grease purgeable labyrinth sealing device is that it allows grease to be purged through the stator itself and not actually through the sealing or through the labyrinth without dislodging the seal from its protective position relative to the bearing housing. Normally, in certain situations when excess grease is applied to a bearing housing, the excess grease would push the dynamic labyrinth sealing device out of position relative to the bearing housing and/or would be caught up in the labyrinth seal itself. In some cases, the grease would push the seal right out of the bore or out of its protective position relative to the bearing housing. So, with the grease purgeable seal of the present application, before the dynamic labyrinth sealing device is pushed out of the bore the grease is actually diverted out the exit slot or expulsion port. However, the grease expulsion port shares some of the same channels as the water/contaminate exit port.

If the rotor were to shift into the stator, the friction caused by the pressure between the large surface area of the contacting rotor and stator surfaces could cause the labyrinth sealing device to fail by preventing the rotor from rotating. A protrusion or annular ring formed on the surface of the rotor has proven effective to prevent large wear areas between the stator and rotor in large diameter labyrinth sealing devices as well as extending the useful life of the labyrinth sealing device by greatly reducing the contacting surface between the stator and the rotor. If the rotor and stator were to shift positions and one were forced into the other, instead of the whole surface area of the stator/rotor being in contact and creating a drag on rotor rotation, the annular ring or the protrusion significantly reduces the area of contact between the stator and the rotor and thereby reduces the wear experienced therebetween. The large area of contact situation has been known to cause performance problems, especially in the larger size labyrinth sealing devices.

An additional feature of the present innovative grease purgeable labyrinth sealing device is the design of the shape of the grooves that house the O-rings that seal the grease purgeable labyrinth sealing device to the bearing housing. Specifically, the grooves are designed such that, when the pressure from the excess grease begins to move the stator away from the bearing housing, the O-rings are more firmly compressed between the groove surface and the bearing housing. Thereby, making it more difficult for the pressure from the excess grease to dislodge the grease purgeable labyrinth sealing device from its proper, protective position.

Figure 2:
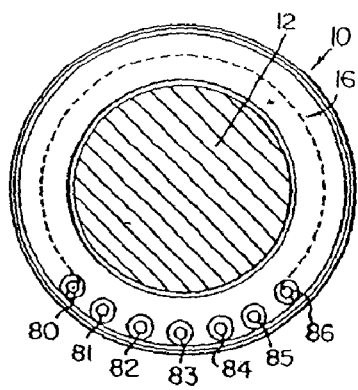
FIG. 2 is a cross-sectional view of the labyrinth sealing device of the subject application taken along line 2—2 of FIG. 1.

As shown in FIGS. 1 and 2, presently preferably, seven apertures 80, 81, 82, 83, 84, 85 and 86 are formed in this surface of the stator 16 of the grease purgeable labyrinth sealing device 10. Each aperture, presently, preferably, has a forty five degree (45°) counter sink 90 on the surface of the stator most proximate the bearing housing 14 and/or the bearings when placed in its operative position. The forty five degree (45°) counter sink merges with the remainder or cylindrical portion 92 of the aperture which is formed in the stator 16 and extends to and is operatively connected to an expulsion port 94 which provides for the movement of the grease outside of the stator 16 without contacting the rotor 18.

As shown in FIG. 2, the center aperture 83 when positioned in its operating position is preferably positioned at a dead bottom center location with respect to the longitudinal axis of rotating shaft 12 with the remaining six apertures 80, 81, 82, 84, 85 and 86 being equally spaced therefrom along the circumference of the stator 16.

Figure 3:
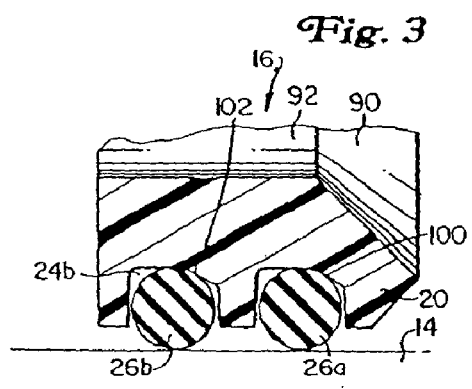
FIG. 3 is a cross-sectional view of the stator O-ring grooves of the labyrinth sealing device of the subject application.

As shown in FIG. 3, details of the O-rings 26a, 26b and the grooves 24a, and 24b, are illustrated. The bottom surfaces 100, 102 of the grooves, 24a and 24b are shaped such that the bottom surfaces 100, 102, of the grooves 24a and 24b most proximate the bearing housing, are less deep than the bottom surfaces of the grooves 24a and 24b most remote from the bearing housing 14. While a specific angle relationship of the bottom surface of the grooves is shown in FIG. 3, it is to be understood that a plurality of possible specific groove shapes could be used as long as when the stator 16 is forced to move from right to left, as seen in FIG. 3, the O-rings 26a, 26b would be moved from left to right and therefore would come under greater compression and, thus, increase the compression between the bearing housing 14 and each of the O-rings 26a and 26b.

FIG. 4, is an exploded view of the grease purgeable labyrinth sealing device 10 of the present application. As shown, the rotor 18 and stator 16 are assembled together as described in U.S. Pat. Nos. 6,015,153 and 5,908,195. The O-rings 26a, 26b are positioned in the grooves 24a 24b respectively. Baffle 104 is assembled in the groove formed in the stator having the expulsion port 50 connected thereto. Baffle 104 prevents grease from moving in any direction other than down from the expulsion port. An O-ring 58 is operatively positioned in groove 56 formed in the rotor 18. A flange 106 is operative to press fit over the rotor/stator interface to assist in the prevention of contamination from entering the labyrinth portion of the grease purgeable labyrinth sealing device 10 of the present application.

In operation, as shown in FIGS. 1–3, when grease is applied to the bearing housing 14 and excess grease is moved between the bearing housing and the stator 16, the grease would in effect be channeled into the counter sink 90 of each of the apertures 80, 81, 82, 83, 84, 85 and 86, it being understood that any number of apertures and any number of counter sink designs might work and that the potential number of apertures and possible plurality of designs of the counter sink that might work is quite large and that the specific embodiments shown are merely illustrative and representative of a large number of possibilities that would be functional. As the grease enters the counter sink 90 and then moves into the cylindrical portion 92 of any one or all of the apertures, pressure builds between the bearing housing 14 and the stator 16. As the pressure builds, the stator 16 is moved slightly away from the bearing housing 14 and the source of the grease and toward the rotor 18. Thus, the stator 16 is moved such that the O-rings 26a and 26b are moved from left to right in FIG. 3 and are further compressed by bottom surface slopes 100 and 102 so that they provide greater resistance for movement of the stator 16 toward the rotor 14.

Likewise, the counter sink portion 90 dissipates the pressure of the grease and the grease is channeled into the cylindrical portion 92. Next, the grease is moved into expulsion port 94 and is transferred out of the grease purgeable labyrinth sealing device 10. While not specifically shown in FIG. 2, it is understood that the area immediately behind the apertures 80, 81, 82, 83, 84, 85 and 86 is hollow and is partially filled by baffle 104 (see FIG. 4).

Because the purpose of the labyrinth sealing device 10 is to protect the bearings in the bearing housing 14, it is essential that the rotor 18 always rotate with the shaft 12. Thus, to prevent or at lease lengthen the amount of time between failures, a protrusion or annular ring 110 is formed on the surface of the rotor 18 for contacting the opposing surface of the stator 16 such that the size of the contacting surface is greatly reduced.

In operation, while the protrusion 110 will eventually wear so that the surface area in contact between the rotor and stator is greatly increased, the protrusion 110 will greatly lengthen the amount of time before the excessive friction between the contacting surfaces between the rotor and stator cause a failure of the rotor to rotate.

As can be seen from the above, all the objectives of the application have been met by the new innovative grease purgeable dynamic labyrinth sealing device.

While the labyrinth sealing devices described herein constitute preferred embodiments of the invention, it is to be understood that the invention is not limited to these precise embodiments, systems and methods, and that changes may be made therein without departing from the scope of the invention which is defined in the appended claims.

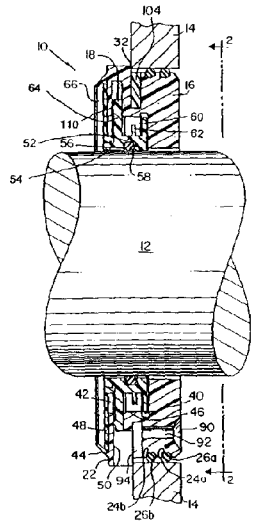

What is claimed is:

1. A dynamic sealing device for placement between a rotating shaft and a bearing housing comprising:

a stator having an annular engagement flange on a radially inner portion thereof, axially opposed first and second end portions, and fluid passage means, operatively formed in the stator, for allowing fluid to move from the first end portion through the stator and out of the stator at the second end portion; and a rotor having an annular engagement flange on a radially outer portion thereof, the stator and the rotor being operatively connected.

2. The dynamic sealing device of claim 1, wherein the fluid passage means further comprises:

at least one aperture operatively positioned in the stator; and an expulsion port, operatively connected to the at least one aperture, for providing a path for a fluid through and out the stator of the dynamic sealing device.

3. The dynamic-sealing device of claim 2, wherein there are at least three apertures operatively positioned in the stator.

4. The dynamic sealing device of claim 2, wherein there are at least five apertures operatively positioned in the stator.

5. The dynamic sealing device of claim 2, wherein there are at least seven apertures operatively positioned in the stator.

6. The dynamic sealing device of claim 1, further comprising:
    at least two grooves, operatively formed on the surface of the stator most proximate the bearing housing, for operatively housing an O-ring in each groove, the O-rings being operatively positioned in the grooves such that when the stator is moved away form the bearing housing, the O-rings are relatively more compressed between the grooves and the bearing housing.

7. The dynamic sealing device of claim 1 further comprising:
    means, operatively formed on the surface of the rotor, for reducing the amount of surface contact between the stator and the rotor when the rotor and the stator surfaces are contacting each other and the rotor rotates with the shaft.

8. A dynamic sealing device for placement between a rotating shaft and a bearing housing comprising:
    a stator having an annular engagement flange on a radially inner portion thereof and fluid passage means, operatively formed in the stator, for allowing fluid to move from the bearing housing through the stator and out of the stator;
    a rotor having an annular engagement flange on a radially outer portion thereof, the stator and the rotor being operatively connected; and
    grooves, operatively positioned on the stator, the grooves including means for increasing the contact pressure between O-rings operatively positioned in the grooves for interacting with the bearing housing when pressure is applied to the dynamic labyrinth sealing device from the axial direction.

9. The dynamic sealing device of claim 8, wherein the fluid passage means further comprises:
    at least one aperture operatively positioned in the stator; and
    an expulsion port, operatively connected to the at least one aperture, for providing a path for a fluid through and out of the dynamic sealing device.

10. The dynamic sealing device of claim 9, wherein there are at least three apertures operatively positioned in the stator.

11. The dynamic sealing device of claim 9, wherein there are at least five apertures operatively positioned in the stator.

12. The dynamic sealing device of claim 8 further comprising:
    means, operatively formed on the surface of the rotor, for reducing the amount of surface contact between the stator and the rotor when the rotor and the stator surfaces are contacting each other and the rotor rotates with the shaft.

13. A dynamic sealing device for placement between a rotating shaft and a bearing housing comprising:
    a stator having an annular engagement flange on a radially inner portion thereof, axially opposed first and second end portions, and fluid passage means operatively formed in the stator, for allowing fluid to move from the first end portion through the stator and out of the stator; at the second end portion;
    at least two grooves, operatively formed on the surface of the stator most proximate the bearing housing, the grooves including a radially inner surface having a tapered portion, the tapered portion increasing the contact pressure between O-rings operatively positioned in the grooves and the bearing housing when pressure is applied to the dynamic sealing device from the axial direction; and
    a rotor having an annular engagement flange on a radially outer portion thereof and an annular ring operatively formed on the portion thereof that contacts the stator when the rotor and the stator are forced into contact when the rotor rotates, the stator and the rotor being operatively connected.

14. The dynamic sealing device of claim 13, wherein the fluid passage means further comprises:
    at least one aperture operatively positioned in the stator; and
    an expulsion port, operatively connected to the at least one aperture, for providing a path for a fluid through and out of the dynamic sealing device.

15. The dynamic sealing device of claim 14, wherein there are at least three apertures operatively positioned in the stator.

16. The dynamic sealing device of claim 14, wherein there are at least five apertures operatively positioned in the stator.

17. The dynamic sealing device of claim 14, wherein there are at least seven apertures operatively positioned in the stator.

18. The dynamic sealing device of claim 13, further comprising:
    at least two grooves, operatively formed on the surface of the stator most proximate the bearing housing, the grooves including means for further compressing an O-ring operatively positioned therein between the groove and the bearing housing when the stator is moved away form the bearing housing.

19. A sealing device comprising:
    a stator having an annular engagement flange on a radially inner portion thereof and fluid passage means, operatively formed in the stator for allowing fluid to move from an interior end of the stator to an exterior end of the stator; and
    a rotor having an annular engagement flange on a radially outer portion thereof, the stator and the rotor being operatively connected.

20. The sealing device of claim 19, wherein the fluid passage means further comprises:
    at least one aperture operatively positioned in the stator; and
    an expulsion port, operatively connected to the at least one aperture, for providing a path for a fluid through and out the stator of the sealing device.

21. The sealing device of claim 20, wherein there are at least three apertures operatively positioned in the stator.

22. The sealing device of claim 20, wherein there are at least five apertures operatively positioned in the stator.

23. The sealing device of claim 20, wherein there are at least seven apertures operatively positioned in the stator.

24. The sealing device of claim 19, further comprising:
    at least two grooves, operatively formed on a radially outer surface of the stator, for operatively housing an O-ring in each groove, the O-rings being operatively positioned in the grooves such that when the stator is moved away form the bearing housing, the O-rings are relatively more compressed between the grooves and the bearing housing.

25. The sealing device of claim 19, further comprising:

means, operatively formed on the surface of the rotor, for reducing the amount of surface contact between the stator and the rotor when the rotor and the stator surfaces are contacting each other and the rotor rotates with the shaft.

26. A sealing device comprising:

a stator having an annular engagement flange on a radially inner portion thereof and fluid passage means, operatively formed in the stator for allowing fluid to move from an interior side of the stator to an exterior side of the stator;

a rotor having an annular engagement flange on a radially outer portion thereof, the stator and the rotor being operatively connected; and grooves, operatively positioned on the stator, the grooves including means for increasing the contact pressure between O-rings operatively positioned in the grooves for interacting with the bearing housing when pressure is applied to the sealing device in the axial direction.

27. The dynamic sealing device of claim 26, wherein the fluid passage means further comprises:

at least one aperture operatively positioned in the stator; and an expulsion port, operatively connected to the at least one aperture, for providing a path for a fluid through and out of the sealing device.

28. The sealing device of claim 27, wherein there are at least three apertures operatively positioned in the stator.

29. The sealing device of claim 27, wherein there are at least five apertures operatively positioned in the stator.

30. The sealing device of claim 26 further comprising:

means, operatively formed on the surface of the rotor, for reducing the amount of surface contact between the stator and the rotor when the rotor and the stator surfaces are contacting each other and the rotor rotates with the shaft.

31. A sealing device comprising:

a stator having an annular engagement flange on a radially inner portion thereof, axially opposed interior and exterior ends, and fluid passage means, operatively formed in the stator for allowing fluid to move from the interior end of the stator to the exterior end of the stator; and a rotor having an annular engagement flange on a radially outer portion thereof and an annular ring operatively formed on the portion thereof that contacts the stator when the rotor and the stator are forced into contact when the rotor rotates, the stator and the rotor being operatively connected.

32. The sealing device of claim 31, wherein the fluid passage means further comprises:

at least one aperture operatively positioned in the stator; and an expulsion port, operatively connected to the at least one aperture, for providing a path for a fluid through and out of the sealing device.

33. The sealing device of claim 32, wherein there are at least three apertures operatively positioned in the stator.

34. The sealing device of claim 32, wherein there are at least five apertures operatively positioned in the stator.

35. The sealing device of claim 32, wherein there are at least seven apertures operatively positioned in the stator.

36. The sealing device of claim 31, further comprising:

at least two grooves, operatively formed on a radially outer surface of the stator, the grooves including means for further compressing an O-ring operatively positioned therein between the groove and the bearing housing when the stator is moved away from the bearing housing.

37. A system for supporting a rotating shaft comprising:

a bearing housing;

a stator having an annular engagement flange on a radially inner portion thereof, axially opposed interior and exterior ends, and fluid passage means, operatively formed in the portion of the stator most proximate to the bearing housing, for allowing fluid to move from the interior end through the stator and out of the stator at the exterior end;

at least two grooves, operatively formed on the surface of the stator most proximate the bearing housing, the grooves including a radially inner surface having a tapered portion, the tapered portion increasing the contact pressure between O-rings operatively positioned in the grooves and the bearing housing when pressure is applied to the stator from the axial direction; and a rotor having an annular engagement flange on a radially outer portion thereof, the stator and the rotor being operatively connected.

38. The sealing device of claim 37, wherein the fluid passage means further comprises:

at least one aperture operatively positioned in the stator; and an expulsion port, operatively connected to the at least one aperture, for providing a path for a fluid through and out the stator of the sealing device.

39. The sealing device of claim 38, wherein there are at least three apertures operatively positioned in the stator.

40. The sealing device of claim 38, wherein there are at least five apertures operatively positioned in the stator.

41. The sealing device of claim 38, wherein there are at least seven apertures operatively positioned in the stator.

42. The sealing device of claim 37, further comprising:

at least two grooves, operatively formed on the surface of the stator most proximate to the bearing housing, for operatively housing an O-ring in each groove, the O-rings being operatively positioned in the grooves such that when the stator is moved away form the bearing housing, the O-rings are relatively more compressed between the grooves and the bearing housing.

43. The sealing device of claim 37, further comprising:

means, operatively formed on the surface of the rotor, for reducing the amount of surface contact between the stator and the rotor when the rotor and the stator surfaces are contacting each other and the rotor rotates with the shaft.

* * * * *

UNITED STATES PATENT AND TRADEMARK OFFICE
CERTIFICATE OF CORRECTION

PATENT NO. : 6,471,215 B1
DATED : October 29, 2002
INVENTOR(S) : James Drago, Joel R. Shaw and Jeffrey M. Grudzien It is certified that error appears in the above-identified patent and that said Letters Patent is hereby corrected as shown below:

Replace the Title page, consisting of FIG. 1 with the attached title page.
Replace Figs. 1-4 with the attached Figs. 1-4.

Column 4,
Line 46, that portion reading "US Pat. Nos. 6,015,193" should read -- US Pat. Nos. 6,015,153 --.

Column 11,
Line 61, that portion reading "A flange 106" should read -- A flange 66 --.

Signed and Sealed this

Ninth Day of September, 2003

JAMES E. ROGAN
*Director of the United States Patent and Trademark Office*

United States Patent
Drago et al.

(10) Patent No.: US 6,471,215 B1
(45) Date of Patent: Oct. 29, 2002

(54) LABYRINTH SEALING DEVICE HAVING A GREASE PURGEABLE SYSTEM

(75) Inventors: James Drago; Joel R. Shaw; Jeffrey M. Grudzien, all of Fairport, NY (US)

(73) Assignee: Garlock Sealing Technologies LLC, Palmyra, NY (US)

(*) Notice: Subject to any disclaimer, the term of this patent is extended or adjusted under 35 U.S.C. 154(b) by 0 days.

(21) Appl. No.: 09/514,099

(22) Filed: Feb. 28, 2000

(51) Int. Cl.$^7$ .............................................. F16J 15/447
(52) U.S. Cl. ...................... 277/412; 277/418; 277/419; 277/420; 277/421
(58) Field of Search ............................... 277/418, 419, 277/420, 421, 358, 361, 371, 374, 411, 412, 928

(56) References Cited

U.S. PATENT DOCUMENTS

| | | | |
|---|---|---|---|
| 2,188,784 A | 1/1940 | Grothouse | 286/11 |
| 2,386,496 A | 10/1945 | Northup | 288/3 |
| 2,822,197 A | 2/1958 | Champ | 286/8 |
| 2,979,350 A | 4/1961 | Lansky | |
| 3,021,182 A | 2/1962 | Schnacke | 308/187 |
| 3,480,284 A | 11/1969 | Voitik | 277/26 |
| 3,536,334 A | 10/1970 | Kendall | 277/103 |
| 4,344,631 A | 8/1982 | Winn | 277/29 |
| 4,494,760 A | 1/1985 | Spargo | 277/30 |
| 5,009,435 A | 4/1991 | Villanyi et al. | 277/23 |
| 5,028,205 A | 7/1991 | Kapadia et al. | 415/112 |
| 5,074,567 A | 12/1991 | Orlowski | |
| 5,100,157 A | 3/1992 | Chabala | 277/27 |
| 5,316,317 A | 5/1994 | Fedorovich et al. | 277/1 |
| 5,480,161 A | * 1/1996 | Borowski | 277/53 |
| 5,522,601 A | 6/1996 | Murphy | 277/53 |
| 5,951,020 A | * 9/1999 | Orlowski | 277/419 |
| 6,015,153 A | 1/2000 | Sharrer | |
| 6,182,972 B1 | * 2/2001 | Orlowski | 277/350 |

FOREIGN PATENT DOCUMENTS

| | | |
|---|---|---|
| EP | 0027539 | 9/1980 |
| GB | 2219475 A | 12/1989 |

* cited by examiner

Primary Examiner—Anthony Knight
Assistant Examiner—Matthew E. Rodgers
(74) Attorney, Agent, or Firm—John M. Harrington; Kilpatrick Stockton LLP

(57) ABSTRACT

A grease purgeable dynamic labyrinth sealing device is disclosed which includes a stator having an annular engagement flange on a radially inner portion thereof and a rotor having an annular engagement flange on a radially outer portion thereof. The stator annular engagement flange and the rotor annular engagement flange have coacting means for mechanically interlocking the stator and the rotor. In one embodiment, means, such as, for example, a plurality of apertures, are operatively formed in the stator for allowing excess grease applied to the bearing housing to move through the stator and out of the stator such that the grease purgeable dynamic labyrinth sealing device maintains proper position relative to the bearing housing and is rotatable with the shaft. In another embodiment, means, operatively formed on the rotor, are provided for reducing the size of the contacting surface area between the stator and the rotor such as, for example, an annular ring or protrusion formed on the surface of the rotor which contacts the stator or vice versa. In yet another embodiment, means are operatively formed on the stator, for increasing the resistance of the stator to move away from the bearing housing when excess grease exits the bearing housing between the bearing housing and the stator, such as, for example, relatively more shallow portions of the O-ring grooves formed in the stator that allow the O-rings to compress when the stator is moved away from the bearing housing.

43 Claims, 2 Drawing Sheets